United States Patent

Levy

[15] 3,696,981

[45] Oct. 10, 1972

[54] FILM POSITION AND BREAK DETECTOR
[72] Inventor: Kenneth Levy, Binghamton, N.Y.
[73] Assignee: The Singer Company, New York, N.Y.
[22] Filed: Sept. 5, 1968
[21] Appl. No.: 757,714

[52] U.S. Cl. .....................226/11, 226/33, 226/49, 250/219 FR
[51] Int. Cl. ...........................................B65h 25/10
[58] Field of Search ........352/92, 236; 226/9, 11, 24, 226/49–51, 33; 250/219 F, 219 ID, 219 FR, 219 FT

[56] References Cited

UNITED STATES PATENTS 1,950,692  3/1934  Owens.........................226/49
2,820,907  1/1958  Silverman..............250/219 Q Primary Examiner—Richard A. Schacher
Attorney—Francis L. Masselle and William Grobman

[57] ABSTRACT

The disclosed exemplification of the present invention is a film position and break detector for use with a motion picture projector and the like. An opaque magnetic material in the form of a strip extends along each longitudinal edge of the film and preferably contains information relating to film speed. A portion of one strip is removed at the beginning end of the film and a portion of the other strip is removed at the finish end of the film leaving transparent portions of the film exposed. A pair of light sources are mounted on one side of the prescribed path of film travel and are positioned to illuminate a respective magnetic strip. A pair of light sensing diodes are mounted on the opposite side of the prescribed path of film travel and are positioned to be illuminated from a corresponding light source in the absence of any magnetic strip interposed therebetween. A circuit is responsive to the conduction of one light sensing diode to actuate the film translating mechanism of the projector to drive the film in one direction and is responsive to the conduction of the other light sensing diode to actuate the translating mechanism to drive the film in the opposite direction. The circuit is further responsive to the conduction of both light sensing diodes to de-energize the film translating mechanism.

6 Claims, 3 Drawing Figures

KENNETH LEVY
INVENTOR.

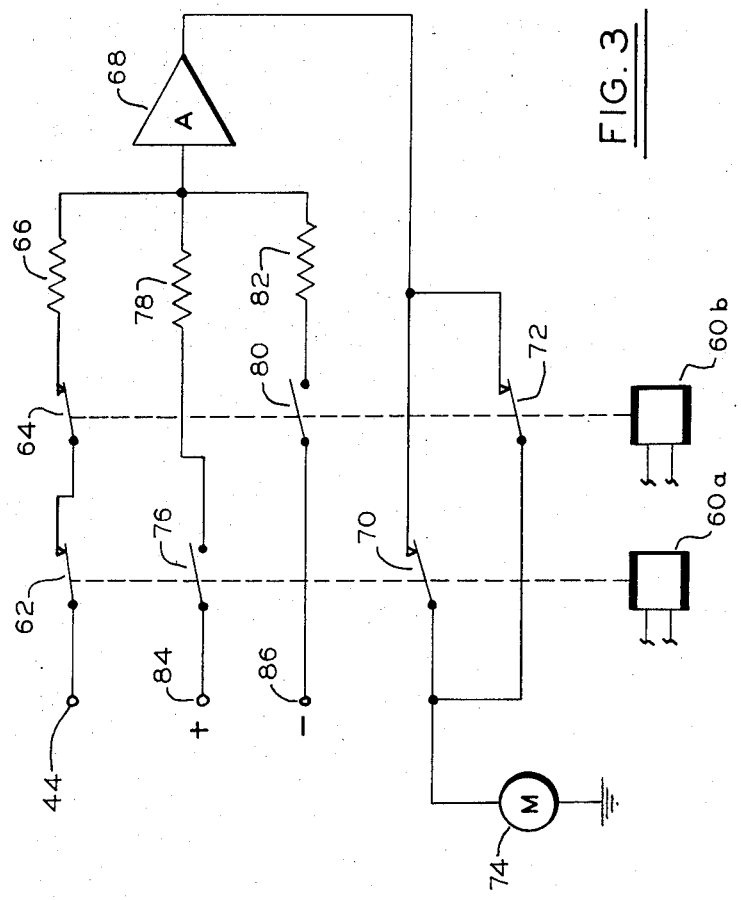

FILM POSITION AND BREAK DETECTOR

This invention relates generally to a control apparatus for a film drive mechanism on a motion picture projector and more particularly to a film position and break detector for actuating the film drive mechanism of the motion picture projector in accordance with the film position and in response to the occurrence of a break in the film.

In a visual system for a vehicle simulator which employs a motion picture projector, it is necessary to maintain the speed of the film in synchronism with the simulated ground speed of the simulator. One method of maintaining such synchronism is to drive the film translating mechanism in accordance with signals derived from the simulator controls and in accordance with information corresponding to the speed of the camera vehicle which photographed the scenes recorded on that particular film. Information which is relevant to the speed of the camera vehicle is recorded on a pair of magnetic strips extending along the longitudinal edges of the film and such information is read by magnetic pick-up heads as the film is transported through the projector optics and the scenes recorded thereon displayed to the trainee within the simulator.

In a visual system for a vehicle simulator it is desirable to operate the projector from a remote station without the necessity of removing the film for purposes of rewinding the film strip. During forward operation of the film translating mechanism, it is preferred to have the mechanism stop the film at the end of the sequence of scenes recorded thereon. Also during rewinding of the film, it is preferred to have the film translating mechanism stop the film at the beginning of a particular sequence of scenes recorded thereon. Information concerning the position of the film is recorded on the magnetic strips extending along the longitudinal edges of the film and is read out therefrom to stop the film translating mechanism at each end of the film.

Since the film in a motion picture projector is usually driven at the rate of 24 frames per second, information is recorded on the magnetic strips on the film at the same rate. However, it may be necessary to operate the film at a relatively low rate of travel such that the information on the magnetic tape cannot be read therefrom. For example, if the film speed is reduced below approximately six frames per second, the information on the magnetic strips cannot be read by the magnetic reading heads. Therefore, if the control device for the film translating mechanism provides a command to drive the translating mechanism at, for example, 1 frame per second, information concerning the position of the film cannot be detected and the film translating mechanism will continue to drive the film off the supply reel. If the end of the film is removed from the supply reel by the film translating mechanism, it is necessary for an operator to rewind the film in the motion picture projector.

This difficulty with driving the film through the motion picture projector usually occurs as a result of a malfunction. Once such a malfunction occurs, the control device for the film translating mechanism including the magnetic readheads can no longer sense information from the magnetic strips and control over the film translating mechanism will be completely lost. Since it is desired to have the film remain threaded on the projector at the beginning and at the end of the sequence of scenes thereon, any malfunction which will cause the film to be translated at a relatively low rate will be effective to obviate this result.

In addition, it is possible for a break to occur in the film strip. If the film strip should break, the information made available on the magnetic strips will not be available to control the film translating mechanism. Consequently, the occurance of a break in the film strip will cause the film translating mechanism to continue supplying film until the film is completely removed from the supply reel. Therefore, a need exists for an arrangement to be used in combination with the magnetic strips and the corresponding magnetic readheads to provide control over the film translating mechanism when the magnetic readheads are ineffective to read the information from the magnetic strips.

Accordingly, it is an object of the present invention to provide a fail safe film position and break detector for use in combination with a film translating mechanism in a motion picture projector.

It is another object of the present invention to provide an apparatus for sensing the end of a particular sequence of scenes recorded on a film during forward operation of a film translating mechanism to drive the film in the opposite direction.

Still another object of the present invention is to provide an apparatus for detecting a break in a motion picture film to deenergize the film translating mechanism associated therewith.

These and other objects of the present invention are realized by the provision of a pair of transparent portions, each disposed at one end of a respective magnetic strip, with one transparent portion provided at one end of the film and the other transparent portion provided at the other end of the film, and means for sensing the translation of the transparent portions from a supply reel to a takeup reel in a motion picture projector. Means are provided for actuating the film translating mechanism to drive the film in one direction in response to sensing one of the transparent portions and to actuate the film translating mechanism to drive the film in the opposite direction in response to sensing the other of the transparent portions. Additional means are provided for deenergizing the film translating mechanism upon the occurance of a break in the film.

A feature of the present invention resides in the provision of a pair of light sources for illuminating a respective magnetic strip and corresponding transparent portion on one side of the film and a pair of light sensors mounted on the other side of the film and disposed for being illuminated by the light sources either through the transparent portions or in the absence of a film and its associated magnetic strips therebetween.

These and other objects, features and advantages of the present invention will be more fully realized and understood from the following detailed description when taken in conjunction with the accompanying drawings wherein:

FIG. 3 is a schematic diagram of the film direction control circuit illustrated in FIG. 1.

Like reference numerals throughout the various views of the drawings are intended to designate the same for similar structures.

Figure 1:
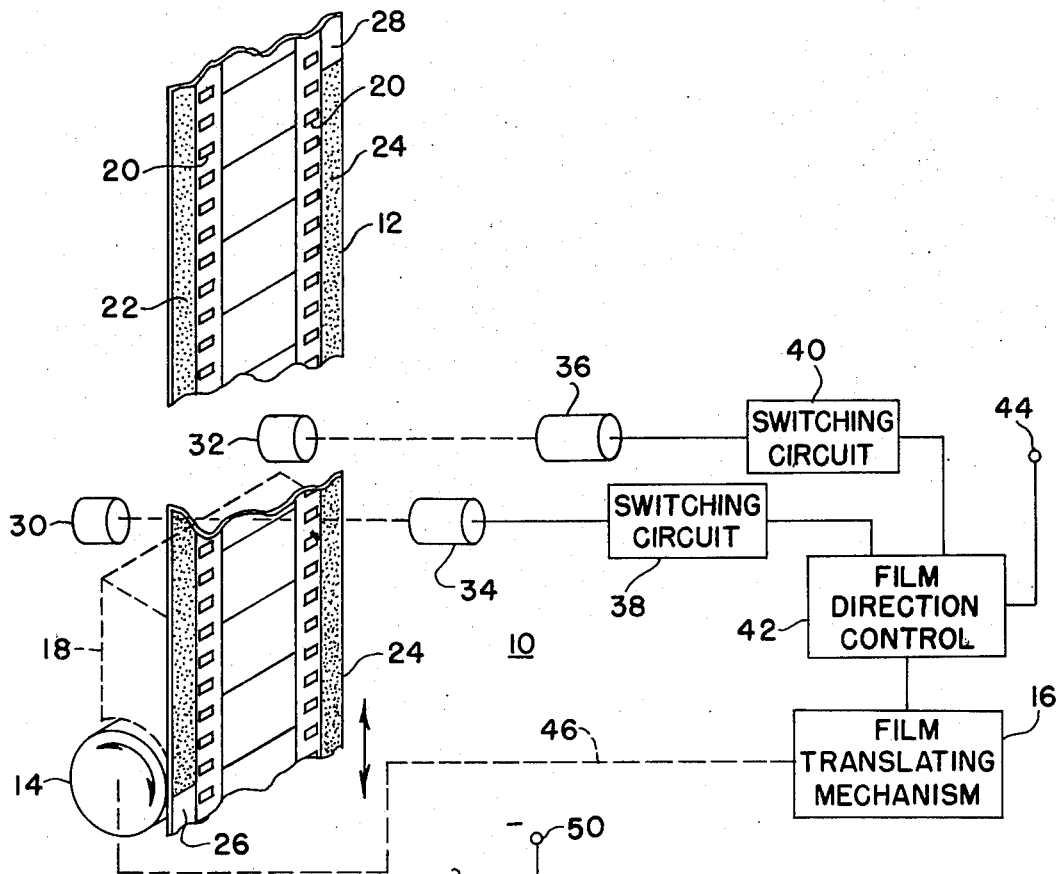
FIG. 1 is a diagramatic and schematic illustration of the film position and break detector constructed in accordance with the principles of the present invention.

With reference to the drawings in detail, and in particular to FIG. 1, there is shown a film position and break detector, generally designated with the reference numeral 10 which is employed in conjunction with a motion picture film strip 12. Only that portion of the motion picture projector is illustrated which is necessary for proper understanding of the present invention. In particular, the film 12 is threaded on an intermittent sprocket 14 of the motion picture projector which is driven from a film translating mechanism 16 through a film trap gate, generally indicated by the dotted line outline designated with the reference numeral 18. The intermittent sprocket 14 is disposed for engaging sprocket holes 20 on the film 12 to pull the film 12 through the film trap gate 18 during forward operation of the motion picture projector and to push the film 12 through the film trap gate 18 during rewind operation of the motion picture projector. The film 12 is provided with a pair of magnetic strips 22 and 24 extending along opposite longitudinal edges thereof. A portion of the magnetic material of the strip 22 is removed adjacent one end of the film 12 to provide a transparent portion 26. In a like manner, a portion of the magnetic material of the strip 24 is removed adjacent the other end of the film 12 to provide a transparent portion 28.

A pair of light sources 30 and 32 are mounted on one side of the film 12 and are disposed for illuminating a respective edge of the film. A pair of light sensors 34 and 36 are mounted on the other side of the film 12 and are disposed for being illuminated by a respective one of the light sources 30 and 32 in the absence of one of the magnetic strips 22 and 24 therebetween. Therefore, when an intermediate portion of the film 12 is passing through the film gate 18, any light which is emitted from the light sources 30 and 32 will be impeded by the opaque magnetic strip 22 and 24 and no light will be transmitted to the light sensors 34 and 36. HOwever, if the transparent portion 26 is disposed between the light source 30 and the light sensor 34, the light sensor 34 will be illuminated. In a like manner, the light sensor 36 will be illuminated from the light source 32 when the transparent portion 28 is interposed therebetween. If a break occurs in the film 12, any light which is emitted from the light sources 30 and 32 will not be impeded by the presence of the film 12 and will illuminate a respective one of the light sensors 34 and 36.

The light sensors 34 and 36 are connected to respective switching circuits 38 and 40 which provide an output in response to the reception of light by the sensors 34 and 36. An output of the switching circuits 38 and 40 is connected to a film direction control signals indicative of the desired direction of film travel. An output of the film direction control circuit 42 is connected to the film translating mechanism 16 to drive the intermittent sprocket 14 through a mechanical coupling indicated by the dashed line which is designated by the reference numeral 46.

In accordance with the principles of the present invention, the switching circuit 38 is effective upon the occurrence of an output signal therefrom to actuate the film translating mechanism 16 to drive the film 12 in one direction and the switching circuit 40 is effective upon the occurrence of an output signal therefrom to actuate the film translating mechanism 16 to drive the film 12 in an opposite direction. The film direction control circuit 42 is also responsive to the simultaneous occurrence of an output from the switching circuits 38 and 40 to deactivate the film translating mechanism 16.

Figure 2:
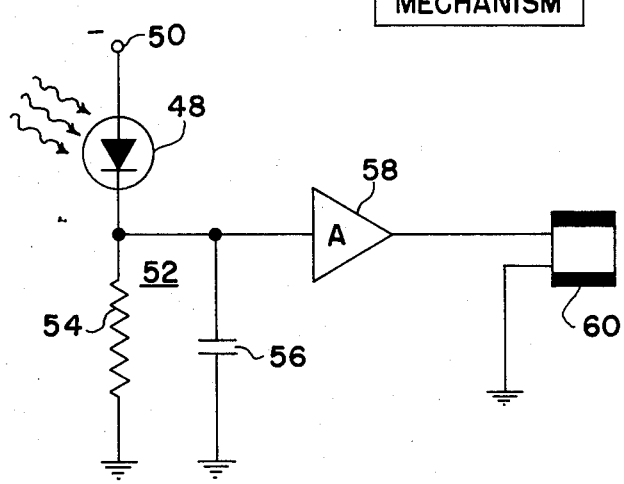
FIG. 2 is a schematic diagram of the switching circuits illustrated in FIG. 1.

A schematic diagram of one of the switching circuits 38, 40 is illustrated in FIG. 2. As shown therein, each of the light sensors 34 and 36 are formed of a photosensitive diode 48 having the anode thereof connected to a source of negative potential on a terminal 50. The cathode of the photosensitive diode 48 is connected through a circuit 52 to ground potential. The circuit 52 is formed of a resistor 54 and a capacitor 56. When light impinges on the photosensitive diode 48, the reverse current therethrough increases substantially and the capacitor 56 charges at a relatively fast rate. If no light impinges on the photosensitive diode 48, the reverse current therethrough is negligible. If the photosensitive diode 48 is rendered non-conductive in the reverse direction after the capacitor 56 has charged, a discharge path has a relatively large time constant of, for example, 10 seconds. If the photosensitive diode 48 is rendered conductive in the reverse direction by the light impinging thereon, the capacitor 56 will begin to charge to a predetermined level and the voltage developed thereacross will be amplified by an amplifier 58 and supplied to a relay 60. When the voltage developed on the capacitor 56 attains a predetermined level, the relay 60 will be actuated to provide an output signal to the film direction control circuit 42.

A schematic diagram of the film direction control circuit 42 is illustrated in FIG. 3. Since each of the switching circuits 38 and 40 are identical as illustrated in FIG. 2, the output relays 60 thereof are designated in FIG. 3 as 60a and 60b. A source of control voltage which may be derived, for example, from a computer which is responsive to information recorded on the magnetic strips 22 and 24, is supplied to the terminal 44. A normally closed switch contact 62 and the relay 60a is connected in series with a normally closed switch contact 64 of the relay 60b and in series with a resistor 66 between the terminal 44 and one input of an amplifier 68. An output of the amplifier 68 is connected through a normally closed contact 70 of the relay 60a in parallel with a normally closed switch contact 72 of the relay 60b to a motor 74 of the film translating mechanism 16. The motor 74 is connected through an intermittent drive (not shown) to the intermittent sprocket 14 by means of a mechanical coupling 46.

By this arrangement, when there is no output signal from the switching circuits 38 and 40, the relays 60a and 60b are not actuated and the control voltage on the terminal 44 is connected to drive the motor 74 in a direction corresponding to the polarity of that signal. The relay 60a includes a normally open switch contact 76 which is connected in series with a resistor 78 between a source of positive voltage and the amplifier 68. In addition, the relay 60b includes a normally open switch contact 80 which is connected in series with a resistor 82 between a source of negative voltage and the amplifier 68. The positive voltage on the terminal 84 and the negative voltage on the terminal 86 are each of sufficient magnitude to drive the film at a rate of 24 frames per second.

During normal operation when an intermediate portion of the film 12 is being driven through the film trap gate 18, the light sensors 34 and 36 will not be illuminated and no output will be provided from the switching circuits 38 and 40. Under such conditions, the relays 60a and 60b will not be actuated and the motor 74 will be driven in accordance with the control signal applied to the terminal 44.

When the film 12 is being advanced in a forward direction to display scenes through the motion picture projector, the transparent portion 28 will be advanced and will ultimately be interposed between the light source 32 and the light sensor 36 such that the light sensor 36 becomes illuminated. When light impinges upon the light sensor 36, an output will be provided from the switching circuit 40 and the relay 60b will be energized to open the switch contacts 64 and 72 and close the switch contact 80. Under such conditions, the control voltage on the terminal 44 will be disconnected from the input to the amplifier 68 and the source of negative voltage on the terminal 86 will be supplied to the input of the amplifier 68 through the switch contact 80 and the resistor 82. The output of the amplifier 68 will be connected through the switch contact 70 to drive the motor 74 in a reverse direction. As a result, the intermittent sprocket 14 will be driven in a counterclockwise direction to drive the film 12 in an upwardly direction through the film trap gate 18 as illustrated in FIG. 1. Because of the relatively long time constant of the circuit 52, the motor 74 will be energized from the source of negative potential on the terminal 86 to advance approximately 240 frames of the film upwardly through the film trap gate 18. After the capacitor 56 has discharged to a level sufficient to release the relay 60b, the switch contacts 64 and 72 will close and the switch contact 80 will open permitting the control voltage on the terminal 44 to dictate the operating conditions of the motor 74. If the malfunction has been corrected in the circuit (not shown) which supplies the control voltage to the terminal 44, the information recorded on the magnetic tracks 22 and 24 can be properly sensed to provide the correct control signal to the terminal 44. If, however, the malfunction has been corrected, the same control voltage which caused the film 12 to be driven to the extreme end position thereof will again be reapplied to the amplifier 68 and the film 12 will again be driven to a point where the transparent portion 28 is interposed between the light source 32 and the light sensor 36. This operation will continually repeat itself until the malfunction is corrected and the proper control voltage is supplied to the terminal 44 to stop the film 12 at the desired position at the end of the film and prior to the point at which the transparent portion 28 is interposed between the light source 32 and the light sensor 36.

Identical conditions exist if the film 12 is being rewound on the supply reel (not shown) by virtue of the intermittent sprocket 14 being driven in a counterclockwise direction as illustrated in FIG. 1. That is, if the circuit supplying the control voltage to the terminal 44 is not functioning properly and the control voltage is sustained sufficient to drive the film 12 to a point where the transparent portion 26 is interposed between the light source 30 and the light sensor 34, the switching circuit 38 will provide an output to the film direction control circuit 42 to drive the film 12 in a forward direction. Under such conditions, the relay 60a will be energized to open the switch contacts 62 and 70 and close the switch contact 76 to apply the positive voltage on the terminal 84 to the input of the amplifier 68. The output of the amplifier 68 will be connected through the switch contact 72 to the motor 74 to drive the film 12 in a downwardly direction through the film trap gate 18 as illustrated in FIG. 1. If the malfunction is corrected, the information contained on the magnetic tracks 22 and 24 will control the position of the film 12 by means of the control voltage applied to the terminal 44 and will position the film 12 in accordance with the information on the magnetic tracks 22 and 24.

If a break should occur in the film 12, both of the light sensors 34 and 36 will be illuminated from the corresponding light sources 30 and 32 to provide an output from each of these switching circuits 38 and 40. Under such conditions, the switch contacts 70 and 72 will be open disconnecting the output of the amplifier 68 from the motor 74 causing the motor 74 to become deenergized. It can be readily appreciated that the device of the present invention provides control over the position of the film 12 if a malfunction occurs in the circuit which supplies the control voltage for the film drive mechanism. Furthermore, the device of the present invention provides control over the film drive mechanism in the event that a break occurs in the film such that the film will not be continually driven during such a break.

The principles of the present invention explained in connection with the specific exemplification thereof as described hereinabove and illustrated in the accompanying drawings will suggest many other applications and modifications of the same. It is accordingly desired that, in construing the breadth of the appended claims, they shall not be limited to the specific details shown and described in connection with the disclosed exemplification of the present invention.

The invention claimed is:

1. In combination with a film drive mechanism for translating a film in two opposite directions, a pair of opaque strips disposed on respective opposite longitudinal edges of the film, a first said strips extending from one end of the film to a spaced distance from the other end of the film, a second of said strips extending from said other end of the film to a spaced distance from said one end of the film, a film position detector comprising a pair of light sources disposed for illuminating one side of respective edges of the film, a pair of light sensors mounted on the other side of respective edges of the film and disposed for being illuminated from a respective one of said light sources in the absence of a respective one of said opaque strips therebetween, and logic means responsive to the illuminating of only one of said light sensors for actuating the film drive mechanism to translate the film in a corresponding direction and to the illumination of both of said light sensors for deenergizing the film drive mechanism.

2. In combination with a film drive mechanism for translating a film in two opposite directions, a pair of opaque strips formed of magnetic material capable of having information recorded thereon indicative of film speed and position and disposed on respective opposite longitudinal edges of the film, a first of said strips extending from one end of the film to a spaced distance from the other end of the film, a second of said strips extending from said other end of the film to a spaced distance from said one end of the film, a film position detector comprising a pair of light sources disposed for illuminating one side of respective edges of the film, a pair of light sensors mounted on the other side of respective edges of the film disposed for being illuminated from a respective one of said light sources in the absence of a respective one of said opaque strips therebetween, first means responsive to the illumination of one of said light sensors for actuating the film drive mechanism to translate the film in one direction, and second means responsive to the illumination of the other of said light sensors for actuating the film drive mechanism to translate the film in an opposite direction.

3. In combination with a film drive mechanism for translating a film in two opposite directions, a pair of opaque strips disposed on respective opposite longitudinal edges of the film, a first of said strips extending from one end of the film to a spaced distance from the other end of the film, a second of said strips extending from said other end of the film to a spaced distance from said one end of the film, a film position detector comprising a pair of light sources disposed for illuminating one side of respective edges of the film, a pair of light sensors mounted on the other side of respective edges of the film and disposed for being illuminated from a respective one of said light sources in the absence of a respective one of said opaque strips therebetween, first means responsive to the illumination of one of said light sensors for actuating the film drive mechanism to translate the film in one direction, and second means responsive to the illumination of the other of said light sensors for actuating the film drive mechanism to translate the film in an opposite direction, said first and said second means each including means for energizing the film drive mechanism only for a predetermined time period following interruption of the illumination of each of said light sensors.

4. In combination with a film drive mechanism for translating a film in two opposite directions which is connected to a source of control voltage having a polarity and magnitude determining the direction and speed respectively of film travel, a pair of opaque strips disposed on respective opposite longitudinal edges of the film, a first of said strips extending from one end of the film to a spaced distance from the other end of the film, a second of said strips extending from said other end of the film to a spaced distance from said one end of the film, a film position detector comprising a pair of light sources disposed for illuminating one side of respective edges of the film, a pair of light sensors mounted on the other side of respective edges of the film and disposed for being illuminated from a respective one of said light sources in the absence of a respective one of said opaque strips there-between, first means responsive to the illumination of one of said light sensors for actuating the film drive mechanism to translate the film in one direction, and second means responsive to the illumination of the other of said light sensors for actuating the film drive mechanism to translate the film in an opposite direction, said first and said second means each including means for disconnecting said source of control voltage from said film drive mechanism in response to the illumination of said one and said other light sensor respectively.

5. In combination with a film drive mechanism for translating a film in two opposite directions, a pair of opaque strips disposed on respective opposite longitudinal edges of the film, a first of said strips extending from one end of the film to a spaced distance from the other end of the film, a second of said strips extending from said other end of the film to a spaced distance from said one end of the film, a film position detector comprising a pair of light sources disposed for illuminating one side of respective edges of the film, a pair of light sensors mounted on the other side of respective edges of the film and disposed for being illuminated from a respective one of said light sources in the absence of a respective one of said opaque strips therebetween, first means responsive to the illumination of one of said light sensors for actuating the film drive mechanism to translate the film in an opposite direction, and detector further comprising means responsive to the simultaneous illumination of both of said light sensors for de-energizing the film drive mechanism.

6. In combination with a film drive mechanism for translating a film in two opposite directions, a pair of opaque strips disposed on respective opposite longitudinal edges of the film, a first of said strips extending from one end of the film to a spaced distance from the other end of the film, a second of said strips extending from said other end of the film to a spaced distance from said one end of the film, a film position detector comprising a pair of light sources disposed for illuminating one side of respective edges of the film, a pair of light sensors mounted on the other side of respective edges of the film and disposed for being illuminated from a respective one of said light sources in the absence of a respective one of said opaque strips therebetween, first means responsive to the illumination of one of said light sensors for actuating the film drive mechanism to translate the film in one direction, and second means responsive to the illumination of the other of said light sensors for actuating the film drive mechanism to translate the film in an opposite direction, each of said light sensors being formed of a photosensitive diode, each of said first and said second means including a time constant circuit connected in series with a respective one of said diodes across a source of voltage and switching means connected to said time constant circuit for actuating the film drive mechanism.

* * * * *